(12) United States Patent
Guo et al.

(10) Patent No.: US 10,285,188 B2
(45) Date of Patent: May 7, 2019

(54) GROUP BASED DOWNLINK TRANSMISSION

(71) Applicant: Telefonaktiebolaget LM Ericsson (publ), Stockholm (SE)

(72) Inventors: Zhiheng Guo, Beijing (CN); Jianfeng Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 174 days.

(21) Appl. No.: 15/500,157

(22) PCT Filed: Sep. 11, 2014

(86) PCT No.: PCT/CN2014/086278
§ 371 (c)(1),
(2) Date: Jan. 30, 2017

(87) PCT Pub. No.: WO2016/037334
PCT Pub. Date: Mar. 17, 2016

(65) Prior Publication Data
US 2017/0273097 A1    Sep. 21, 2017

(51) Int. Cl.
*H04W 72/12*    (2009.01)
*H04W 16/28*    (2009.01)

(52) U.S. Cl.
CPC ......... *H04W 72/121* (2013.01); *H04W 16/28* (2013.01); *H04W 72/1247* (2013.01)

(58) Field of Classification Search
CPC ............... H04W 16/28; H04W 72/121; H04W 72/1247
See application file for complete search history.

(56) References Cited

U.S. PATENT DOCUMENTS

| 7,088,671 | B1 * | 8/2006 | Monsen | H04B 1/7107 370/203 |
| 7,206,608 | B1 * | 4/2007 | Wu | H04W 16/28 342/354 |
| 2001/0034236 | A1 * | 10/2001 | Tong | H04W 16/28 455/450 |

(Continued)

FOREIGN PATENT DOCUMENTS

| CN | 101674120 A | 3/2010 |
| CN | 102378205 A | 3/2012 |
| WO | 2014070050 A1 | 5/2014 |

OTHER PUBLICATIONS

Extended European Search Report for European Patent Application No. 14901451.6, dated Mar. 14, 2018, 7 pages.

(Continued)

*Primary Examiner* — Dung B Huynh
(74) *Attorney, Agent, or Firm* — Patent Portfolio Builders, PLLC

(57) ABSTRACT

The embodiments disclose a method in an AP for downlink transmission in a beamforming radio communication network. The method comprises grouping a plurality of terminal devices to be scheduled for downlink transmission into one or more groups; and associating each of the one or more groups with a different one of digital chains in the AP, wherein payloads to be transmitted to terminal devices in a same group are processed by a digital chain associated with the group.

15 Claims, 8 Drawing Sheets

(56) References Cited

U.S. PATENT DOCUMENTS

| | | | |
|---|---|---|---|
| 2002/0051430 A1* | 5/2002 | Kasami | H04W 16/28 370/319 |
| 2002/0086708 A1* | 7/2002 | Teo | H04L 27/2602 455/561 |
| 2003/0087673 A1* | 5/2003 | Walton | H04B 7/0452 455/562.1 |
| 2003/0114195 A1* | 6/2003 | Chitrapu | H01Q 1/246 455/562.1 |
| 2003/0125040 A1* | 7/2003 | Walton | H04B 7/0417 455/454 |
| 2004/0004945 A1* | 1/2004 | Monsen | H04B 1/71052 370/328 |
| 2005/0064872 A1* | 3/2005 | Osseiran | H04B 7/0408 455/452.1 |
| 2006/0256886 A1* | 11/2006 | Har | H04L 1/0631 375/260 |
| 2006/0270343 A1* | 11/2006 | Cha | H04B 7/0413 455/25 |
| 2006/0281494 A1* | 12/2006 | Wilson | H01Q 1/246 455/562.1 |
| 2008/0146238 A1* | 6/2008 | Saito | H04B 7/0491 455/442 |
| 2008/0198793 A1* | 8/2008 | Lysejko | H04W 16/28 370/328 |
| 2008/0267142 A1* | 10/2008 | Mushkin | H01Q 1/2291 370/338 |
| 2009/0318088 A1* | 12/2009 | Wu | H04B 7/0697 455/63.4 |
| 2010/0056171 A1* | 3/2010 | Ramprashad | H04W 16/10 455/452.1 |
| 2010/0284446 A1* | 11/2010 | Mu | H04B 7/15521 375/211 |
| 2010/0303004 A1* | 12/2010 | Mueck | H04L 1/0625 370/328 |
| 2011/0013506 A1* | 1/2011 | Ishii | H04W 72/1242 370/208 |
| 2011/0070822 A1* | 3/2011 | Schlee | H04B 7/0452 455/17 |
| 2011/0103254 A1 | 5/2011 | Guo | |
| 2011/0212695 A1* | 9/2011 | Wild | H01Q 3/26 455/73 |
| 2011/0305164 A1* | 12/2011 | Zhang | H04B 7/024 370/252 |
| 2012/0155378 A1* | 6/2012 | Kim | H04B 7/18515 370/319 |
| 2012/0327872 A1* | 12/2012 | Han | H04B 7/043 370/329 |
| 2013/0003691 A1* | 1/2013 | Xiao | H04B 7/0452 370/329 |
| 2013/0040682 A1* | 2/2013 | Chang | H01Q 1/243 342/368 |
| 2013/0064129 A1* | 3/2013 | Koivisto | H04B 7/0621 370/252 |
| 2013/0088391 A1* | 4/2013 | Corman | H04B 7/10 342/365 |
| 2013/0107791 A1* | 5/2013 | Oh | H04B 7/0452 370/312 |
| 2013/0223251 A1* | 8/2013 | Li | H04W 72/046 370/252 |
| 2013/0286960 A1* | 10/2013 | Li | H04W 72/042 370/329 |
| 2014/0050280 A1* | 2/2014 | Stirling-Gallacher | H04B 7/0486 375/296 |
| 2014/0177607 A1* | 6/2014 | Li | H04B 7/0617 370/336 |
| 2014/0321563 A1* | 10/2014 | Park | H04L 25/03898 375/260 |
| 2014/0334566 A1* | 11/2014 | Kim | H04B 7/0469 375/267 |
| 2014/0348051 A1* | 11/2014 | Park | H04W 72/005 370/312 |
| 2015/0078199 A1* | 3/2015 | Lin | H04W 24/02 370/254 |
| 2015/0333884 A1* | 11/2015 | Athley | H04L 5/0048 375/295 |
| 2015/0381396 A1* | 12/2015 | Chen | H04W 74/08 370/254 |
| 2016/0057640 A1* | 2/2016 | Zhao | H04W 24/08 370/252 |
| 2016/0197659 A1* | 7/2016 | Yu | H04W 16/28 370/335 |
| 2016/0309396 A1* | 10/2016 | Chai | H04W 16/28 |
| 2016/0329943 A1* | 11/2016 | Selen | H04B 7/0408 |
| 2017/0272223 A1* | 9/2017 | Kim | H04B 7/0617 |

OTHER PUBLICATIONS

Hui, Dennis et al., "Future Radio Access," 098: Initial Beam Search and Alignment for UDN, 90% Seminar, May 10, 2012, Ericsson, 50 pages.

Hui, Dennis et al., "FRA concept report 2013," 2013, Ericsson, 160 pages.

International Search Report and Written Opinion for International Patent Application No. PCT/CN2014/086278, dated Jun. 3, 2015, 11 pages.

Office Action in application No. 14901451.6 dated Nov. 15, 2018 6 pages.

* cited by examiner

GROUP BASED DOWNLINK TRANSMISSION

This application is a 35 U.S.C. § 371 national phase filing of International Application No. PCT/CN2014/086278, filed Sep. 11, 2014, the disclosure of which is incorporated herein by reference in its entirety.

TECHNICAL FIELD

The present technology relates to the field of radio communication, particularly to a method for downlink transmission in a beamforming radio communication network. The technology also relates to an access point (AP) and a computer readable storage medium for performing the method.

BACKGROUND

An Ultra Dense Network (UDN) is typically ultra-densely deployed in highly populated areas such as hot spots, office building, or downtown area at cities, where there are demands of high data rate service. Currently, data traffic is boosting rapidly while there is a clear bandwidth limit in low frequency bands. Hence, it is necessary for UDN to utilize a higher carrier frequency and is a wider bandwidth in order to reach an even higher data rate. Accordingly, the UDN is supposed to operate over higher frequency, such as Millimeter-wave (mmW) frequencies ranged from 30 GHz to 300 GHz.

Since the UDN is expected to be deployed in high frequency bands where radio wavelengths are substantially smaller than those in conventional cellular networks being deployed in relatively low frequency bands, a considerable number of antenna elements can be implemented in communication nodes with small physical dimensions. For example, a typical number discussed is in the order of 64 antenna elements in an access point (AP). The large number of antenna elements will be used to employ beamforming technique to create beams with high directivity, which should help avoiding interference between links in the densely deployed networks.

However, since there are much more antennas for one communication node than what we have today, this kind of system has the hardware limitations from the point of view of maximizing performance. In particular, it would be desirable to have full control over each individual antenna element; however this would require a complete digital chain per antenna element, which is not feasible due to the high power consumption of the digital processing and Digital-to-Analog Conversion (DAC) at the large system bandwidths considered for the UDNs. In this case, the number of digital chains is always constrained to be an acceptable value less than the number of antennas so as to save the power consumption and implementation complexity.

In addition, in the UDN, one digital chain in an AP is used to dedicatedly serve one user equipment (UE) in downlink transmission. As such, the maximal number of UEs that can be supported simultaneously in a subframe is equal to the number of digital chains in the AP. Hence, the maximum number of UEs that can be served simultaneously in each subframe is constrained by the limited number of digital chains, which results in low transmission efficiency.

SUMMARY

It's an object of the present disclosure to resolve or alleviate at least one is of the problems mentioned above.

A first aspect of the present disclosure is a method in an AP for downlink transmission in a beamforming radio communication network. The method comprises grouping a plurality of terminal devices to be scheduled for downlink transmission into one or more groups; and associating each of the one or more groups with a different one of digital chains in the AP, wherein payloads to be transmitted to terminal devices in a same group are processed by a digital chain associated with the group.

A second aspect of the present disclosure is a computer readable storage medium storing instructions. When run on an AP, the instructions cause the AP to perform the steps of the method as described above.

A third aspect of the present disclosure is an AP configured to perform downlink transmission in a beamforming radio communication network. The AP comprises a grouping unit and an associating unit. The grouping unit is adapted to group a plurality of terminal devices to be scheduled for downlink transmission into one or more groups. The associating unit is adapted to associate each of the one or more groups with a different one of digital chains in the AP, wherein payloads to be transmitted to terminal devices in a same group are processed by a digital chain associated with the group.

A fourth aspect of the present disclosure is an AP configured to perform downlink transmission in a beamforming radio communication network. The AP comprises a processor and a memory. The memory contains instructions executable by the processor whereby the AP is operative to group a plurality of terminal devices to be scheduled for downlink transmission into one or more groups; and associate each of the one or more groups with a different one of digital chains in the AP, wherein payloads to be transmitted to terminal devices in a same group are processed by a digital chain associated with the group.

Through processing payloads transmitted to a group of terminal devices instead of a single terminal device in one digital chain, a larger number of terminal devices than the number of digital chains in the AP can be supported simultaneously in a subframe. Since a digital chain can be used to serve multiple terminal devices simultaneously, a relatively small number of digital is chains are needed to perform downlink transmission for the terminal devices. Therefore, the processing and transmission power is saved, and the air interface resources are used more efficiently.

BRIEF DESCRIPTION OF THE DRAWINGS

The technology will be described below, by way of example, based on embodiments with reference to the accompanying drawings, wherein.

DETAILED DESCRIPTION

Figure 1:
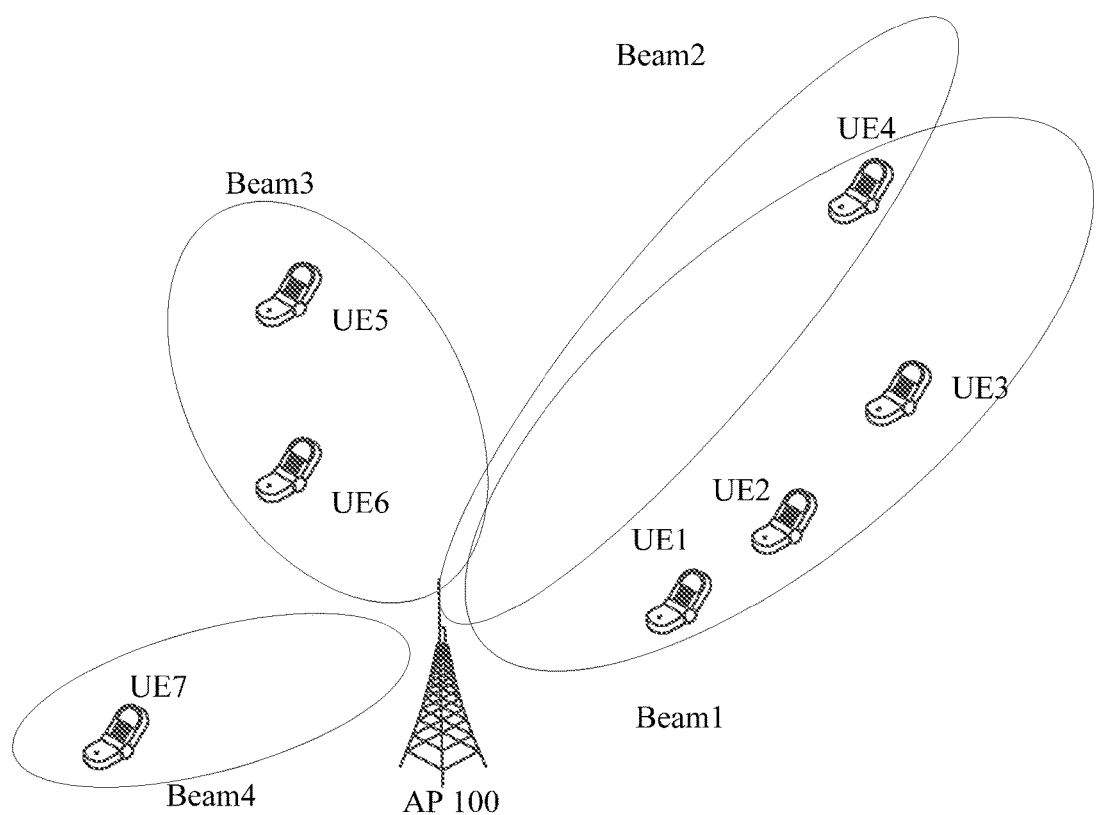
FIG. 1 illustrates an exemplary beamforming radio communication network environment that is suitable for implementing the embodiments of the present disclosure.

Embodiments herein will be described hereinafter with reference to the accompanying drawings. The embodiments herein may, however, be embodied is in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understand that the embodiments are not limited to those specific terms but may be applied to all similar entities, such as base station, cell, sector, femto base station, NodeB, Evolved NodeB (eNodeB) etc.

By way of example, the embodiments herein will be discussed in the context of the UDN. It should be appreciated that the embodiments are applicable to all radio networks that involve the transmission using beamforming technique.

Embodiments herein will be described below with reference to the drawings.

FIG. 1 illustrates an exemplary beamforming radio communication network environment that is suitable for implementing the embodiments of the present disclosure. As shown, the AP 100 serves 7 UEs, UE1-UE7 and employs beamforming technique to communicate with the UEs. As known, beamforming is a signal processing technique used in an antenna array for directional signal transmission or reception. This is achieved by combining elements in the array in such a way that signals at particular angles experience constructive interference while others experience destructive interference.

Here, only one AP and seven UEs are shown in the beamforming radio communication network for simplicity, it should be appreciated that one or more APs may exist in the radio communication network, and each AP may serve one or more UEs in the mean time. In an embodiment, these APs may be densely deployed.

Figure 2:
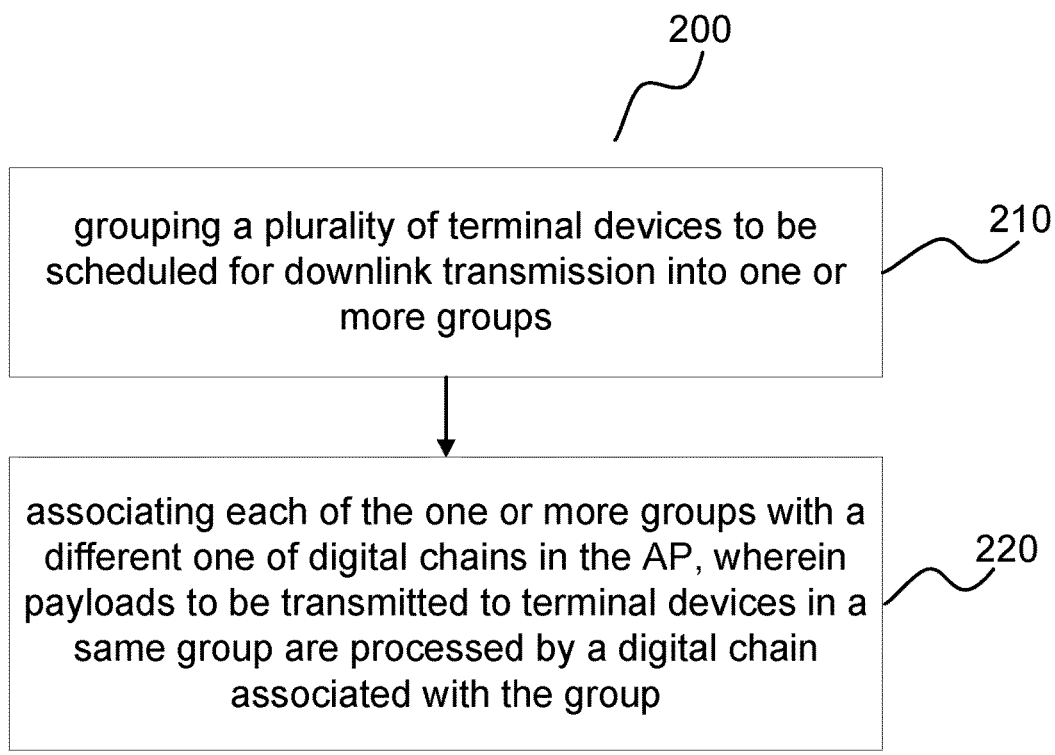
FIG. 2 schematically illustrates a flowchart of downlink transmission in an AP in accordance with an embodiment.

FIG. 2 schematically illustrates a flowchart of downlink transmission in accordance with an embodiment. The downlink transmission refers to the data transmission from the AP (e.g. AP 100) to the terminal device (e.g. UE1-UE7). Typically, the AP 100 may have multiple antennas which are used to generate beams directed to different directions. Here, the terminal device may be any device intended for requesting services via a radio communication network and configured to communicate over the radio communication network. For instance, the terminal device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or personal computer (PC). The terminal device may be a portable, pocket-storable, hand-held, computer-comprised, or vehicle-mounted mobile device, enabled to communicate voice and/or data, via a wireless connection. Herein, the UE and the terminal device are used in an exchangeable way.

Now the process of the embodiment will be described in detail with reference to FIG. 2.

In block 210, the AP 100 groups a plurality of terminal devices UE1-UE7 to be scheduled for downlink transmission into one or more groups.

In an embodiment, the AP 100 may group the plurality of terminal devices based on positions of the plurality of terminal devices. Since payloads to be transmitted to the terminal devices within the same group will be transmitted over the same beam, the terminal devices within the same group should be covered by the same beam. As known, each beam has a determined coverage angle such as 10, 20, 30 or 50 degree. Hence, if the angle between two terminal devices with respect to the AP 100 is smaller than a threshold angle, in other words, the two terminal devices can be covered by a beam, then they can be grouped into a same group.

As illustrated in FIG. 1, the angle between UE5 and UE6 with respect to the AP 100 is smaller than the coverage angle of a beam, the UE5 and UE6 thus can be assigned into a group. However, the angle between the UE7 and UE6 with respect to the AP 100 is larger than all the available coverage angles of beams, the UE7 and UE6 can not be grouped together.

Additionally, channel qualities between the plurality of terminal devices and the AP can be used to further determine if a terminal device is suitable to be grouped into a group. The channel quality between the terminal device and the AP can be measured by the Signal Noise Ratio (SNR), the distance from the terminal device to the AP or the channel state information (CSI). For example, because the angle between UE5 and UE6 with respect to the AP 100 is smaller than the coverage angle of a beam, i.e. the UE5 and UE6 are covered by the beam, the UE5 and UE6 are intended to be grouped together. In this case, the AP 100 may communicate with the UE5 and UE6 so as to obtain measurements of the channel quality between the UE5 and the AP 100 and the channel quality between the UE6 and the AP 100, and then compare the channel quality measurements with respective channel quality thresholds. If both of the UE5 and UE6 have a channel quality higher than or equal to the respective channel quality threshold, the UE5 and UE6 can be grouped into a group and communicate with the AP over the beam. On the other hand, if the channel quality for a UE (e.g. UE5 or UE6, or both) is below a respective threshold, it means that an effective communication cannot be established over this beam between the AP and the UE, the UE cannot be grouped for transmission over this beam and another group and thus beam has to be selected for this UE.

In block 220, the AP 100 associates each of the one or more groups with a different one of digital chains in the AP. Generally, the AP comprises both analog domain processing and digital domain processing for the transmitted/received signals. The analog domain processing refers to the processing for the transmitted/received signals in the analog domain, including carrier demodulation, filtering, band-pass to low-pass/low-pass to band-pass processing, etc. The digital domain processing includes modulation, encoding, resource allocation, Fast Fourier Transform (FFT), etc. The digit-to-analog (D/A)/analog-to-digit (A/D) conversion between the analog domain and the digital domain is performed by the DA converter and AD converter. Herein, the digital chain refers to a series of elements/components used to process the digital signal in the digital domain, normally including the D/A and/or A/D converters. Please note that the series of elements/components used for digital processing can usually be implemented by a digital processor (such as digital processor 920 in FIG. 9 or digital processor 1001 in FIG. 10). Generally, the number of D/A converters is equal to the number of digital chains in the AP. In other words, in the present disclosure, the number of the digital chains can be considered to be equal to the number of D/A converter.

The payloads to be transmitted to terminal devices in a same group are processed by a digital chain associated with the group. For example, the group G1 includes UE1 and UE2, and the group G2 includes UE5 and UE6. As such, the AP 100 may associate the G1 with digital chain DC1 and associate the G2 with digital chain DC2. Then, the DC1 processes payloads to be transmitted to UE1 and UE2, and the DC2 processes payloads to be transmitted to the UE5 and UE6. In an embodiment, the payloads that are processed by the same digital chain may be allocated with the orthogonal frequency resources. In this way, the payload transmission to the respective UEs such as UE1 and UE2 will not interfere with each other.

Through processing payloads to a group of terminal devices instead of a single terminal device in one digital chain, a larger number of terminal devices than the number of digital chains in the AP can be supported simultaneously in a subframe. Since a digital chain can be used to serve multiple terminal devices simultaneously, a relatively small number of digital chains are needed to perform downlink transmission for the terminal devices, or more UEs can be supported simultaneously in the condition that the number of the digital chains is fixed. Therefore, the processing and transmission power is saved, and the air interface resources are used more efficiently.

Figure 3:
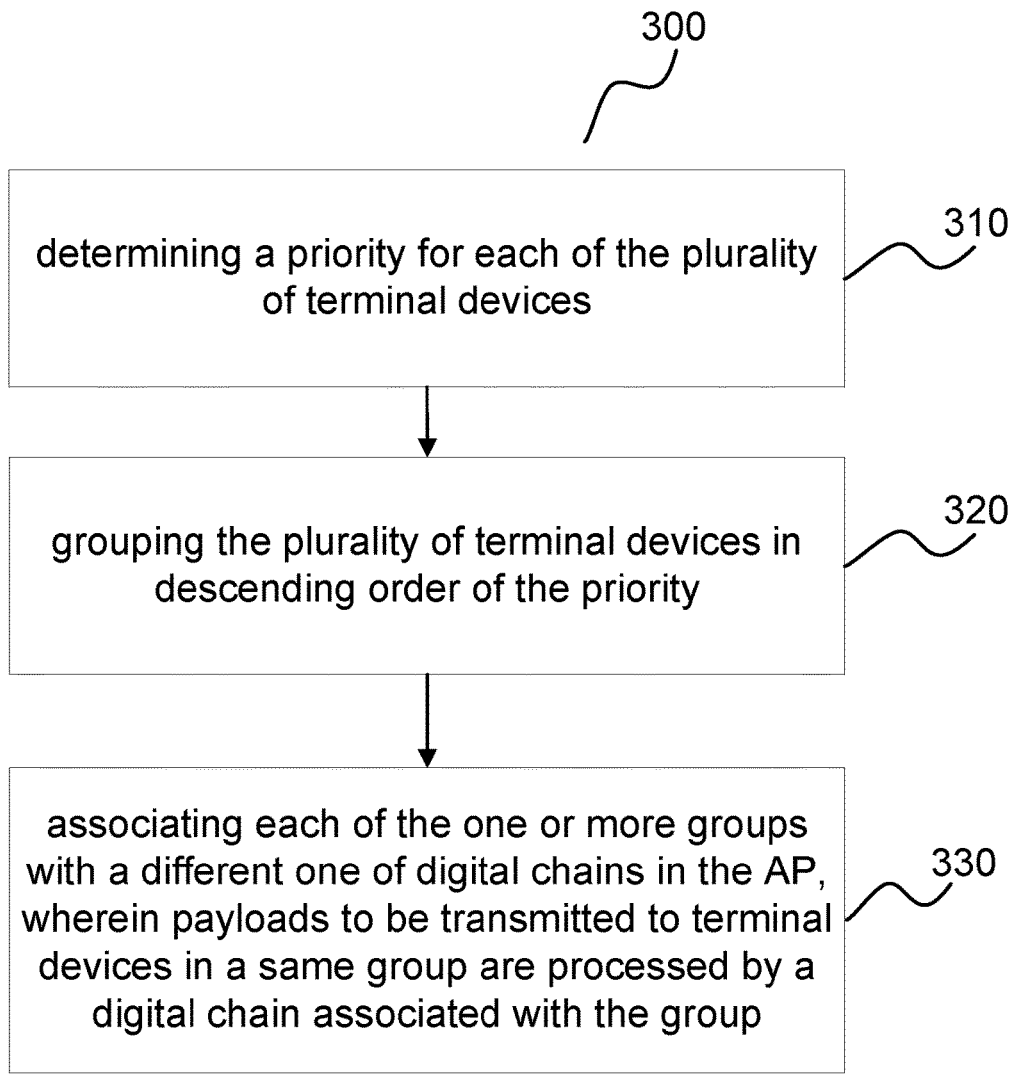
FIG. 3 schematically illustrates a flowchart of downlink transmission in an AP in accordance with an embodiment.

FIG. 3 schematically illustrates a flowchart of downlink transmission in accordance with an embodiment. As illustrated, the process of the embodiment comprises blocks 310, 320 and 330. Please note that the block 330 is performed in the same way as the block 220 in FIG. 2, and thus will not be repeated here for purpose of brevity. Now the other procedures of the embodiment will be set forth in detail with reference to FIG. 3.

The AP, for example the AP 100, may determine the priority for each of the plurality of terminal devices, for example the UE1-UE7, in block 310. In an embodiment, the priority can be determined based on type of payload to be transmitted to each of the plurality of terminal devices. Here, the types of payload may comprise various kinds of control signaling and data traffic. The control signaling may comprise layer-1 signaling such as Acknowledgement/Negative acknowledgement (ACK/NACK) in the physical layer, scheduling grant for uplink, CQI (Channel Quality Indicator)-ReportConfig message, PhysicalConfigDedicated message and RadioResourceConfigDedicated message, layer-2 signaling such as radio resource control (RRC) signaling and media access control information, automatic repeat request (ARQ) ACK/NACK signaling and layer-3 signaling such as ACK/NACK in the network layer.

In some cases, the type of payload to be transmitted to a terminal device may reflect the terminal device's priority. Typically, the control signaling has a higher transmission priority than the data traffic. As such, if the control signaling payload is to be transmitted to the terminal device 1, and the data traffic payload is to be transmitted to the terminal device 2, then the terminal device 1 has a higher priority than the terminal device 2.

Additionally or alternatively, a variety of types of payload may differentiate on the transmission latency tolerance. If a payload type for a terminal device requires a lower latency than a payload type for another terminal device, then the terminal device has a higher priority than the another terminal device. For example, the layer-1 signaling requires a lower latency than the layer-2 signaling, thereby having a higher priority than the layer-2 signaling.

Additionally or alternatively, as described above, each group is associated with a different digital chain so as to be processed. Hence, the number of groups can not be more than the number of the available digital chains. In this case, it would be desirable to group as many as possible terminal devices into one group, because this can enable even more terminal devices to be served simultaneously. In addition, the terminal devices with the same payload type is are typically intended to be grouped together. Therefore, a terminal device whose payload type is a relatively common payload type among payload types for the plurality of terminal devices will be given a relatively high priority. In other words, if the number of terminal devices with a first payload type is larger than the number of terminal devices with a second payload type among the plurality of terminal devices to be scheduled, the terminal device with the first payload type has a higher priority than the terminal device with the second payload type. Taking control signaling for example, among the plurality of terminal devices to be scheduled for downlink transmission UE1-UE7, the type of payloads to be transmitted to the UE1-UE2 and UE4-UE6 is layer-1 signaling, while the type of payloads to be transmitted to the UE3 and UE7 is layer-3 signaling. As indicated, the number of terminal devices with the layer-1 signaling is 5, while the number of terminal devices with layer-3 signaling is 2. As such, the UE1-UE2 and UE4-UE6 have a higher priority than the UE3 and UE7. Alternatively, if the total amount of a first payload type (in particular, a control signaling) to be scheduled for downlink transmission is larger than the total amount of a second payload type (in particular, another control signaling) to be scheduled for downlink transmission, the terminal device with the first payload type has a higher priority than the terminal device with the second payload type. Please be noted that, although the above discusses differentiation of priorities based on commonness or amount of payload, the data traffic preferably usually has a lower priority than the control signaling, regardless the commonness or amount of the data traffic.

Moreover, the time lapsed since last downlink transmission to the terminal devices can be used as an additional factor to determine the priority for each of the terminal devices. For example, it is determined that the UE1 has a higher priority than the UE 3 based on their payload type. However, the time of last downlink transmission to the UE3 is much earlier than the time of last downlink transmission to the UE1. In this case, the UE3 can be set a higher priority over the UE1. In this way, each of the terminal devices won't wait long for the arrival of the next downlink transmission to the terminal device.

It should be appreciated that the terminal devices also can be prioritized in other ways. For example, a terminal device with a very important person (VIP) service level has a higher priority than a terminal device with an ordinary service level.

After the priority for each of the plurality of terminal devices is determined, the AP 100 may group the plurality of terminal devices UE1-UE7 in descending order of their priorities in block 320. As described above, the number of groups is constrained by the number of the available digital chains. In this way, only the terminal devices with the lowest priorities are left ungrouped, therefore, the downlink transmission for the terminal devices with higher priorities is ensured.

Figure 4:
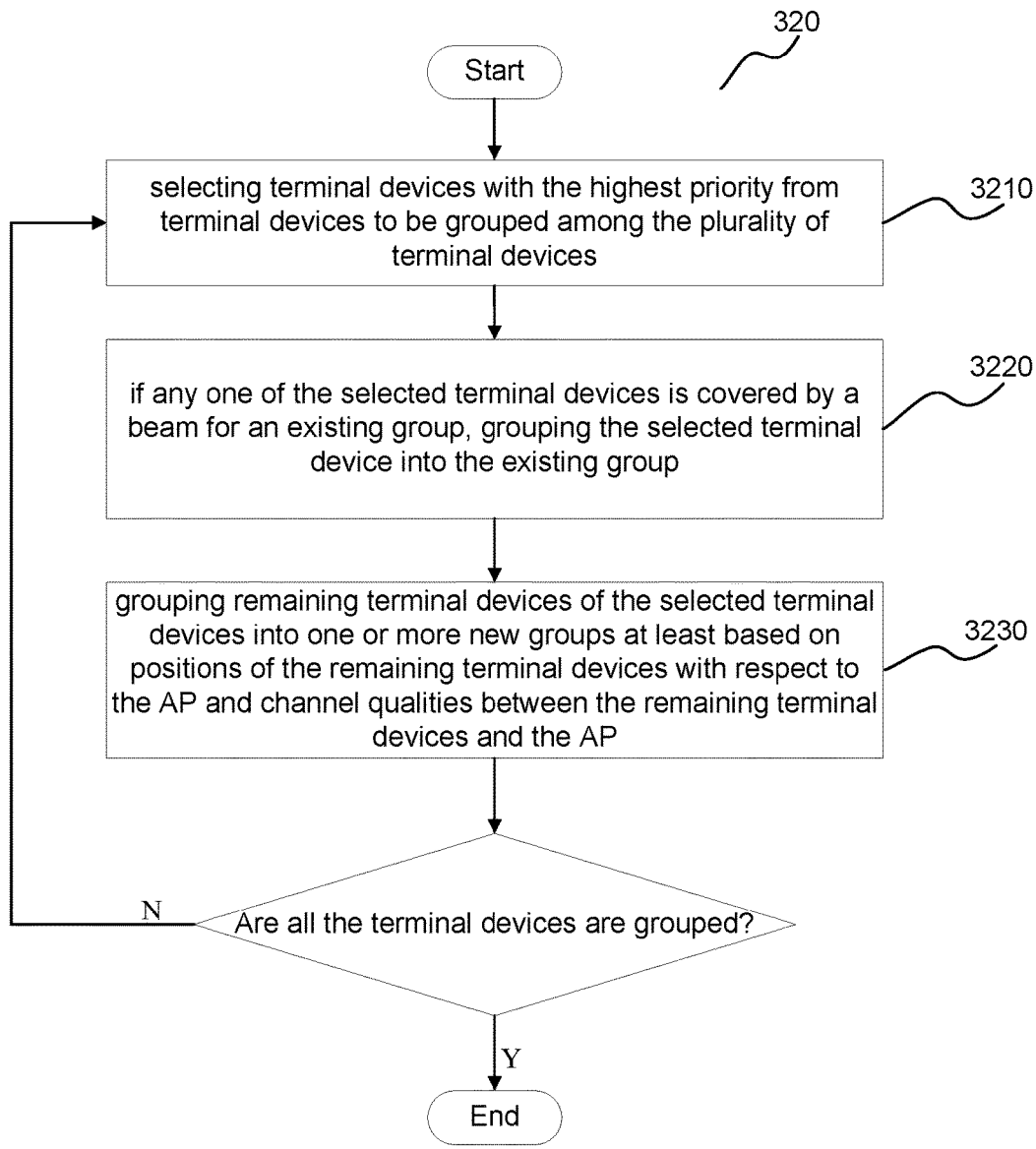
FIG. 4 schematically illustrates a flowchart of grouping a plurality of terminal devices in an AP in accordance with an embodiment.

Here, the grouping process will be set forth by way of example with reference to FIG. 4.

In block 3210, the AP 100 may select terminal devices with the highest priority from terminal devices to be grouped among the plurality of terminal devices, UE1-UE7. As described above, the type of payloads to be transmitted to the UE1-UE2 and UE4-UE6 is layer-1 signaling, while the type of payloads to be transmitted to the UE3 and UE7 is layer-3 signaling in the example, hence the UE1-UE2 and UE4-UE6 have the same highest priority among UE1-UE7. The UE1-UE2 and UE4-UE6 are the selected terminal devices.

In block 3220, the AP 100 may check if any one of the selected terminal devices is covered by a beam of an existing group. If yes, the AP 100 may directly group the selected device into the existing group. Here, since there is no existing group available yet, the AP 100 may proceed with the subsequent procedure, i.e. block 3230.

In block 3230, the AP 100 may group the selected terminal devices, UE1-UE2 and UE4-UE6, into one or more new groups at least based on positions of the selected terminal devices with respect to the AP 100 and channel qualities between the selected terminal devices and the AP 100 as described above.

For example, it is found based on their positions that UE1, UE2 and UE4 can be covered by Beam1 and thus may be grouped together. Furthermore, it is determined that the channel quality between the UE1 and the AP 100 over the beam is higher than the channel quality threshold required by the payloads to be transmitted to UE1, and so does the UE2. But the channel quality between the UE4 and the AP 100 over the Beam1 is lower than the channel quality threshold required by the payloads to be transmitted to UE4. As such, the UE1 and UE2 are grouped into a group G1 and payloads to be transmitted to the UEs in the group G1 will be transmitted over Beam1. UE4, however, cannot be assigned into the group G1 due to low channel quality over Beam1. The AP 100 thus may create a new group G2 to include UE4 and use another beam Beam2 to transmit the payloads for group G2. As for the UE5 and UE6, neither of them can be covered by Beam 1 or Beam 2, and therefore cannot be included into group G1 or G2. Nonetheless, UE5 and UE6 can be covered by the beam Beam3, and thus may form a new group G3. Accordingly, payloads to be transmitted to the UEs in the group G3 will be transmitted over Beam3.

Generally, when a group can be covered by several beams, the narrower beam is preferred to the wider beam to be used for downlink transmission, since the narrower beam can provide with higher beamforming gain than the wider beam.

Now the UE1-UE2 and UE4-UE6 have been grouped, but there are still some terminal devices (i.e. UE3 and UE7) left ungrouped. Hence, the AP 100 will repeat the above procedures 3210-3230.

In this iteration, the AP 100 selects the UE3 and UE7, since they have the same highest priority among the terminal devices to be grouped. Since the UE7 is not covered by any one of the beams Beam1-Beam3 of the existing groups G1-G3, the AP 100 may create a new group G4 to include the UE7. As for the UE3, it is covered by the beam Beam1, hence the UE3 is included into the group G1.

At this point, all the terminal devices to be scheduled for downlink transmission have been grouped into the individual groups G1-G4, the grouping process ends. Alternatively, if the number of created groups is above the number of the digital chains in the AP 100, the grouping process will also end regardless whether or not all the terminal devices to be scheduled for downlink transmission have been grouped. In this case, the terminal devices ungrouped yet will not be scheduled in this downlink transmission. They have to be scheduled in the next downlink transmission, for example.

Furthermore, in the grouping embodiment above, if a terminal device to be grouped is covered by a beam of an existing group, the AP 100 may directly group the terminal device into the existing group. However, it would be desirable that this terminal device can be grouped into the existing group only if the expected channel quality between the terminal device and the AP 100 over the beam selected for the existing group is larger than a threshold, since this will ensure the quality of the downlink transmission to the terminal device.

In an embodiment, the expected channel quality can be derived from the beamforming gain of the beam (e.g. B1). In particular, the AP 100 may have communicated with the terminal device through another beam (e.g. B2), over which a channel quality (cq1) between the terminal device and the AP 100 was measured. As such, the AP 100 may calculate the disparity between the beamforming gain of B1 ($bg_{B1}$) and beamforming gain of B2 ($bg_{B2}$), and then derive the expected channel quality over the beam B1, for example, as $cq1+(bg_{B1}-bg_{B2})$.

Figure 5:
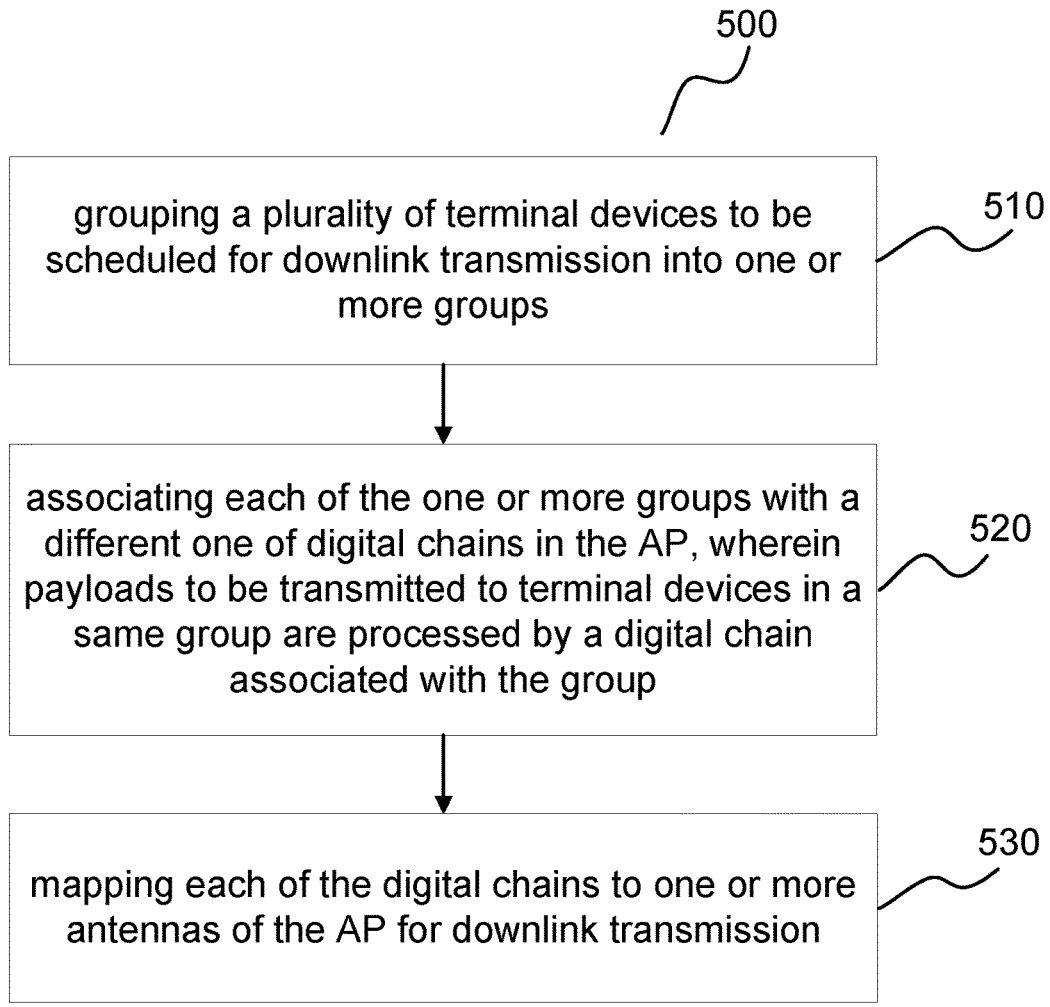
FIG. 5 schematically illustrates a flowchart of downlink transmission in an AP in accordance with an embodiment.

FIG. 5 schematically illustrates a flowchart of downlink transmission in accordance with an embodiment. As illustrated, the process of the embodiment comprises blocks 510, 520 and 530. Please note that the blocks 510 and 520 are performed in the same way as the blocks 210 and 220 in FIG. 2 respectively, and thus will not be repeated here for purpose of brevity. Now the block 530 of the embodiment will be set forth with reference to FIG. 5.

After associating each of the one or more groups with a different one of digital chains in the AP in block 520, the AP, for example AP 100 may map each of the digital chains to one or more antennas of the AP for downlink transmission in block 530. Generally, forming a relatively narrow beam with a high beamforming gain may need more antennas than forming a relatively wide beam with a low beamforming gain.

Moreover, this embodiment can be further combined with the embodiment with reference FIG. 3. In particular, the AP may determine the priority for each of the plurality of terminal devices, group the plurality of terminal devices into one or more groups in descending order of the priority, associate each of the one or more groups with a different one of digital chains in the AP and map each of the digital chains to one or more antennas of the AP for downlink transmission.

Figure 6:
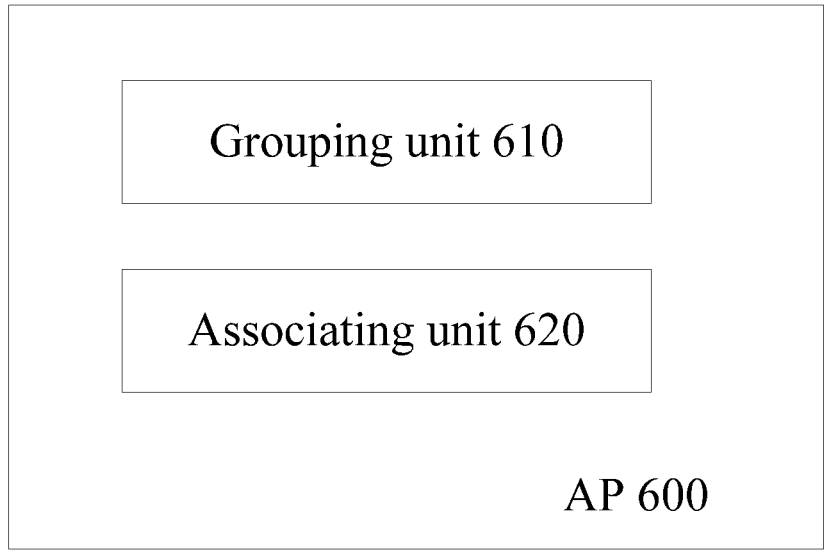
FIG. 6 schematically illustrates a block diagram of an AP configured to perform downlink transmission in accordance with an embodiment.

FIG. 6 schematically illustrates a block diagram of an AP 600 configured to perform downlink transmission in accordance with an embodiment. As shown, the AP 600 comprises a grouping unit 610 and an associating unit 620. It should be appreciated that the AP is not limited to the shown elements, and can comprise other conventional elements and the additional elements for other purposes. Here, the AP 600 functions as the AP 100 in FIG. 1. Now the functions of the individual units will be described in detail with reference to the FIG. 1 and FIG. 6.

The grouping unit 610 of the AP 600 is adapted to group a plurality of terminal devices, for example UE1-UE6, to be scheduled for downlink transmission into one or more groups.

In an embodiment, the grouping unit 610 may group the plurality of terminal devices based on positions of the plurality of terminal devices. For example, if the angle between two terminal devices with respect to the AP is smaller than a threshold angle, in other words, the two terminal devices can be covered by a beam, then they can be grouped into a same group. Additionally, channel qualities between the plurality of terminal devices and the AP can be used to further determine if a terminal device is suitable to be grouped into a group as described above.

The associating unit 620 of the AP 600 is adapted to associate each of the one or more groups with a different one of digital chains in the AP. The payloads to be transmitted to terminal devices in a same group are processed by a digital chain associated with the group. For example, the group G1 includes UE1 and UE2, and the group G2 includes UE5 and UE6. As such, the associating unit 620 may associate the G1 with digital chain DC1 and is associate the G2 with digital chain DC2.

Figure 7:
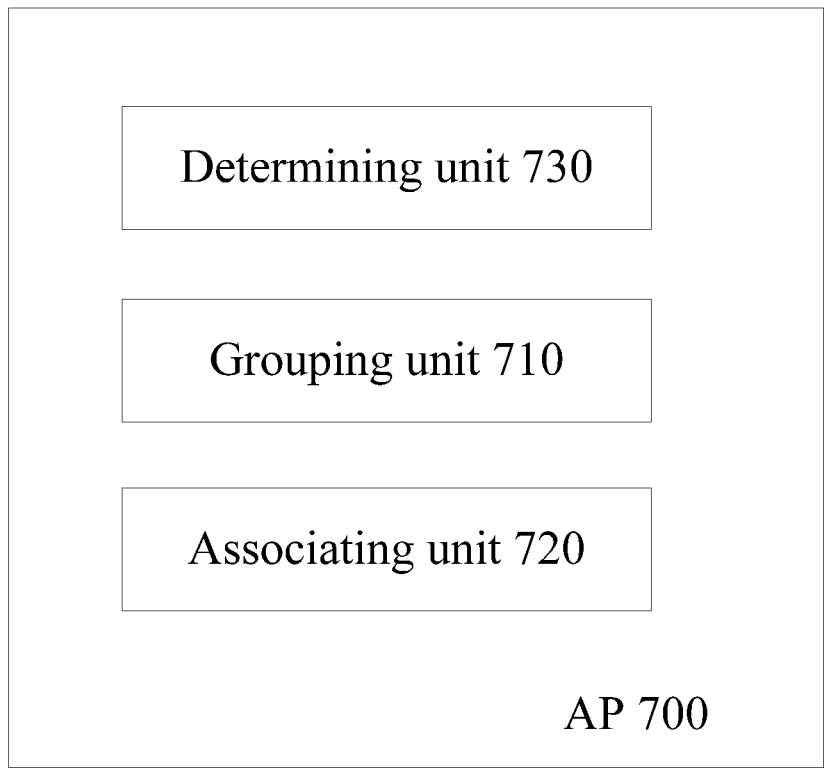
FIG. 7 schematically illustrates a block diagram of an AP configured to perform downlink transmission in accordance with an embodiment.

FIG. 7 schematically illustrates a block diagram of an AP 700 configured to perform downlink transmission in accordance with an embodiment As illustrated, the AP comprises a determining unit 730, a grouping unit 710 and an associating unit 720. Please note that the associating unit 720 functions in the same way as the associating unit 620 in FIG. 6, and thus will not be repeated here for purpose of brevity. Here, the AP 700 functions as the AP 100 in FIG. 1. Now the functions of other units will be described in detail with reference to the FIG. 7.

The determining unit 710 of the AP 700 may be adapted to determine the priority for each of the plurality of terminal devices, for example the UE1-UE7, based on type of payload to be transmitted to each of the plurality of terminal devices.

In some cases, the type of payload to be transmitted to a terminal device may reflect the terminal device's priority. Typically, the control signaling has a higher transmission priority than the data traffic. As such, if the control signaling payload is to be transmitted to the terminal device 1, and the data traffic payload is to be transmitted to the terminal device 2, then the terminal device 1 has a higher priority than the terminal device 2. Additionally or alternatively, a variety of types of payload may differentiate on the transmission latency tolerance. If a payload type for a terminal device requires a lower latency than a payload type for another terminal device, then the terminal device has a higher priority than the another terminal device. Additionally or alternatively, if the number of terminal devices with a first payload type is larger than the number of terminal devices with a second payload type among the plurality of terminal devices to be scheduled, the terminal device with the first payload type has a higher priority than the terminal device with the second payload type. Moreover, the time lapsed since last downlink transmission to the terminal devices can be used as an additional factor to determine the priority for each of the terminal devices.

After the priority for each of the plurality of terminal devices is determined by the determining unit 710, the grouping unit 720 of the AP 700 may be adapted to group the plurality of terminal devices UE1-UE7 in descending order of their priorities.

In an embodiment, the grouping unit 720 may select terminal devices with the highest priority from terminal devices to be grouped among the plurality of terminal devices. Then, the grouping unit 720 may check if any one of the selected terminal devices is covered by a beam of an existing group. If yes, the grouping unit 720 may directly group the selected device into the existing group. Otherwise, the grouping unit 720 may group the selected terminal devices into one or more new groups at least based on positions of the selected terminal devices with respect to the AP and channel qualities between the selected terminal devices and the AP as described above. Subsequently, if there are still terminal devices left ungrouped, the grouping unit 720 will reiterate the above actions until all the terminal devices are grouped or the number of created groups is more than the number of the digital chains in the AP 700.

Alternatively, the grouping unit 720 may group the terminal devices into the existing group only if the expected channel quality between the terminal device and the AP 700 over the beam selected for the existing group is larger than a threshold. This will ensure the quality of the downlink transmission to the terminal device.

Figure 8:
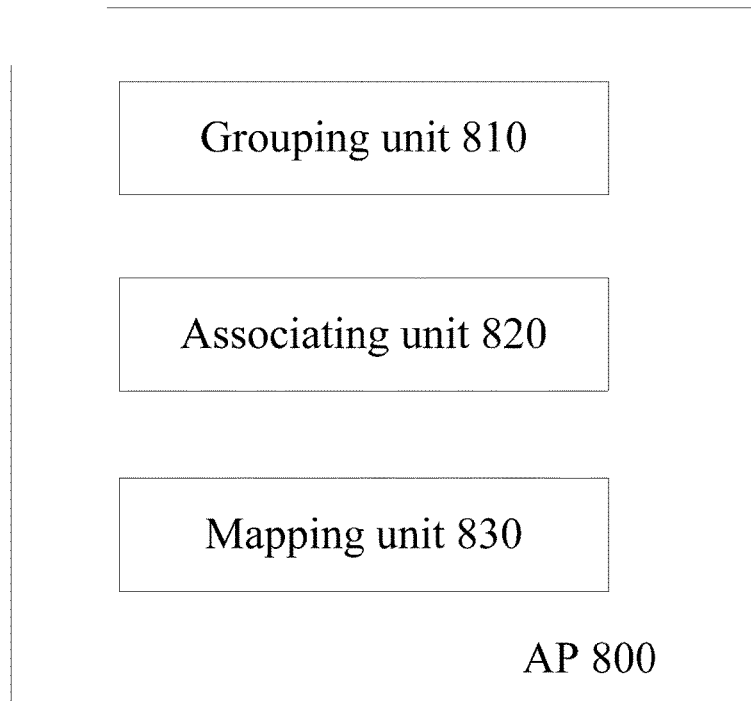
FIG. 8 schematically illustrates a block diagram of an AP configured to perform downlink transmission in accordance with an embodiment.

FIG. 8 schematically illustrates a block diagram of an AP 800 configured to perform downlink transmission in accordance with an embodiment. As shown, the AP 800 comprises a grouping unit 810, an associating unit 820 and a mapping unit 830. Please note that the grouping unit 810 and the associating unit 820 function in the same way as the grouping unit 610 and the associating unit 620 in FIG. 6, and thus will not be repeated here for purpose of brevity. Here, the AP 800 functions as the AP 100 in FIG. 1. Now the function of the mapping unit 830 will be described in detail with reference to the FIG. 8.

After the associating unit 820 associates each of the one or more groups with a different one of digital chains in the AP, the mapping unit 830 may be adapted to map each of the digital chains to one or more antennas of the AP for downlink transmission. Generally, forming a relatively narrow beam with a high beamforming gain may need more antennas than forming a relatively wide beam with a low beamforming gain.

Figure 9:
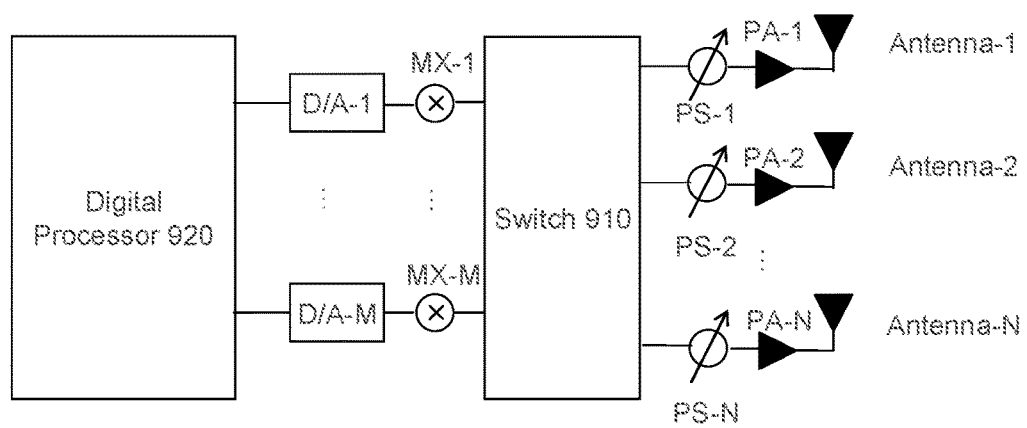
FIG. 9 illustrates an exemplary circuit configured to map each digital chain to one or more antennas of the AP.

FIG. 9 illustrates an exemplary circuit configured to map each digital chain to one or more antennas of the AP. As shown, the digital processor 920 is coupled with a plurality of digital-to-analog converters, D/A-1 to D/A-M and work together to serve as a plurality of digital chains. The mixers (MXs), MX-1 to MX-M, are coupled with the D/A-1 to D/A-M respectively to adapt the signal including gain controlling, carrier modulation, etc. The circuit is configured with a plurality of antennas, Antenna-1 to Antenna-N. The number of the antennas N is larger than the number of the digital chains M. Each of the antennas is coupled with a different one of the phase shifters (PSs), PS-1 to PS-N and a different one of the power amplifiers (PAs), PA-1 to PA-N, serially. In operation, before the signal is transmitted through an antenna, it will experience phase shift by the respective PS, and then power amplification by the respective PA. A switch 910 is connected between the mixers and the PSs in the circuit. The switch 910 is a switch array, which thus can switch the connections between the digital chains and the antennas as appropriate. For example, the mapping unit 820 may determine that the digital chain D/A-1 needs three antennas for downlink transmission, and the digital chain D/A-N needs 2 antennas for downlink transmission. In this case, the switch 910 may connect the digital chain D/A-1 to three antennas, for example Antenna-1 to Antenna-3, and connect the digital chain D/A-N to two other antennas, for example Antenna-4 and Antenna-5.

Figure 10:
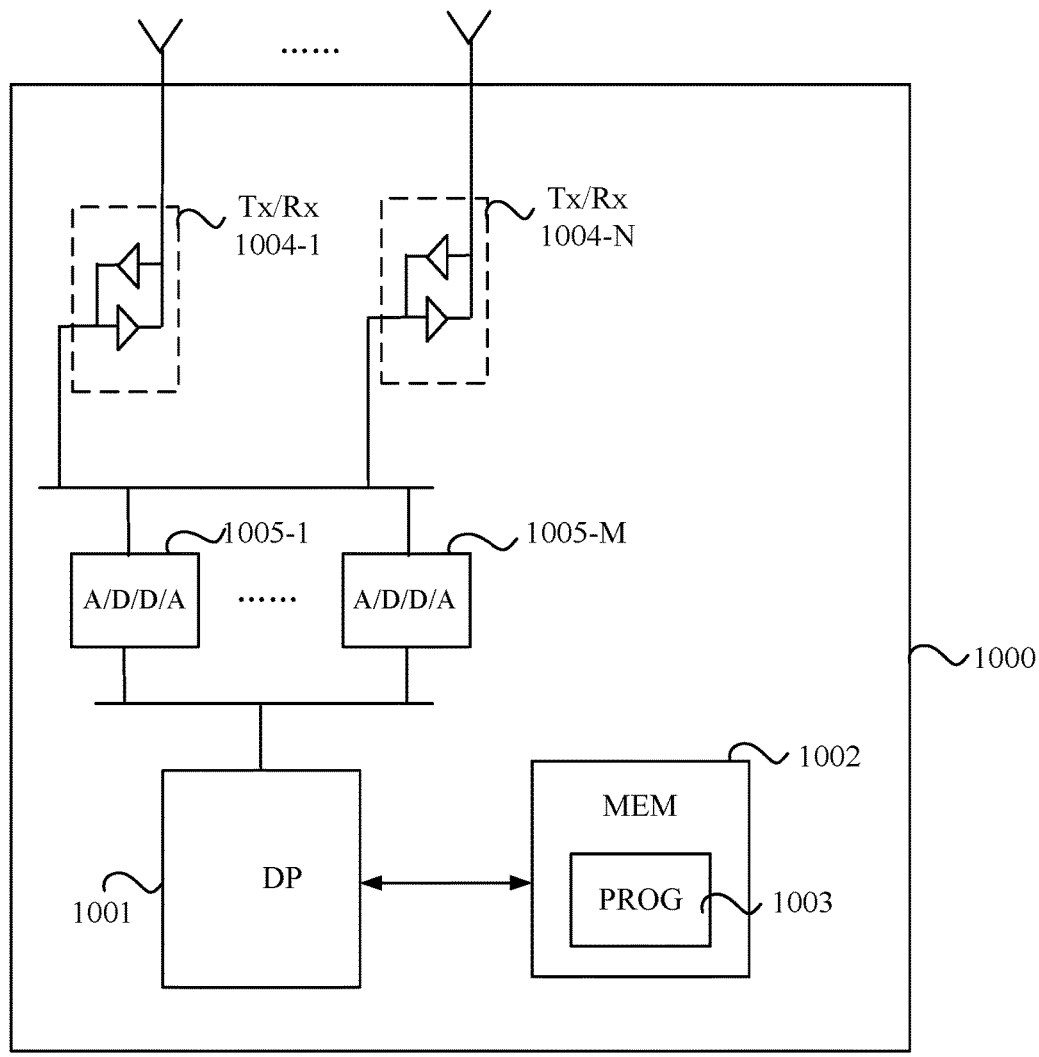
FIG. 10 illustrates a simplified block diagram of an AP that is suitable for use in practicing exemplary embodiments of the present disclosure.

Furthermore, the AP 800 may further comprise a determining unit (not shown) which functions in the same way as the determining unit 730 in FIG. 7. In an embodiment, the determining unit of the AP 800 may be adapted to determine a priority for each of the plurality of terminal devices; the grouping unit 810 may be adapted to group the plurality of terminal devices into one or more groups in descending order of the priority; the associating unit 820 may be adapted to associate each of the one or more groups with a different one of digital chains in the AP; the mapping unit 830 may be adapted to map each of the digital chains to one or more antennas of the AP for downlink transmission. FIG. 10 illustrates a simplified block diagram of an AP 1000 that is suitable for use in practicing exemplary embodiments of the present disclosure.

As shown in FIG. 10, the AP 1000 includes a data processor (DP) 1001, a memory (MEM) 1002 coupled to the DP 1001, a plurality of A/D/D/As 1005-1 to 1005-M coupled to the DP 1001, and a plurality of suitable radio frequency transmitters (TXs) and receivers (RXs) 1004-1 to 1004-N. The plurality of TXs/RXs may be coupled with the plurality of A/D/D/As via a switch (not shown) with reference to FIG. 9, for example. The MEM 1002 stores a program (PROG) 1003. The TX/RXs are for bidirectional wireless communications. In the AP 1000, the number of the A/D/D/As M is less than the number of TX/RXs (i.e. antennas) N. In operation, one A/D/D/A can be associated with one or more antennas for transmission. Here, the DP 1001 may work together with the plurality of A/D/D/As to serve as the plurality of digital chains.

The PROG 1003 is assumed to include program instructions that, when executed by the associated DP 1001, enable the AP 1000 to operate in accordance with the exemplary embodiments of this disclosure, as discussed herein with the methods in FIGS. 2-5. The embodiments of the present disclosure may be implemented by computer software executable by the DP 1001 of the AP 1000, or by hardware, or by a combination of software and hardware.

The MEM 1002 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the AP 1000, there may be several physically distinct memory units in the AP 1000. The DP 1001 may be of any type suitable to the local technical environment, and may include one or more of general purpose computers, special purpose computers, microprocessors, digital signal processors (DSPs) and processors based on multi-core processor architecture, as non limiting examples. The AP 1000 may have multiple processors, such as for example an application specific integrated circuit chip that is slaved in time to a clock which synchronizes the main processor.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

What is claimed is:

1. A method in an access point for downlink transmission in a beamforming radio communication network, the method comprising:
   determining a priority for each of a plurality of terminal devices;
   grouping the plurality of terminal devices to be scheduled for the downlink transmission into one or more groups, wherein the grouping comprises grouping the plurality of terminal devices in a descending order of the priority, and wherein the grouping the plurality of terminal devices in the descending order of the priority comprises:
   (a) selecting terminal devices with the highest priority among the plurality of terminal devices,
   (b) if one of the selected terminal devices is covered by a beam of an existing group, grouping the selected terminal device into the existing group,
   (c) grouping remaining terminal devices of the selected terminal devices into one or more new groups at least based on positions of the remaining terminal devices with respect to the AP and respective channel qualities between the remaining terminal devices and the AP such that all terminal devices within a same group are covered by a beam, and (d) repeating steps (a)-(c) until the plurality of terminal devices are grouped; and associating each of the one or more groups with a different one of digital chains in the AP, wherein payloads to be transmitted to terminal devices in a same group are processed by a digital chain associated with the group.

2. The method of claim 1, wherein the determining comprises determining the priority for each of the plurality of terminal devices at least based on a type of payload to be transmitted to each of the plurality of terminal devices.

3. The method of claim 2, wherein if a payload type for a terminal device requires a lower latency than a payload type for another terminal device, the terminal device has a higher priority than the another terminal device.

4. The method of claim 2, wherein if a number of terminal devices, among the plurality of terminal devices, with a first payload type is larger than a number of terminal devices, among the plurality of terminal devices, with a second payload type, the terminal devices with the first payload type have a higher priority than the terminal devices with the second payload type.

5. The method of claim 2, wherein the priority for each of the plurality of terminal devices is determined further based on a time lapsed since last downlink transmission to the terminal device.

6. The method of claim 2, wherein the type of payload comprises one or more of layer-1 signaling, layer-2 signaling and layer-3 signaling.

7. The method of claim 1, wherein the step (b) comprises if one of the selected terminal devices is covered by the beam for the existing group and a channel quality between the one of the selected terminal devices and the AP over the beam is larger than a threshold, grouping the one of the selected terminal devices into the existing group.

8. The method of claim 7, wherein the channel quality between the selected terminal device and the AP is derived from a beamforming gain of the beam.

9. The method of claim 1, wherein the method further comprises mapping each of the digital chains to one or more antennas of the AP for downlink transmission.

10. The method of claim 1, wherein the beamforming radio communication network is an ultra-densely deployed network.

11. The method of claim 1, wherein the plurality of terminal devices are user equipments.

12. An access point AP configured to perform downlink transmission in a beamforming radio communication network, the AP comprising a processor adapted to:

determine a priority for each of a plurality of terminal devices;

group the plurality of terminal devices to be scheduled for the downlink transmission into one or more groups, wherein the plurality of terminal devices are grouped in a descending order of the priority by:

(a) selecting terminal devices with the highest priority among the plurality of terminal devices, (b) if one of the selected terminal devices is covered by a beam of an existing group, grouping the selected terminal device into the existing group, (c) grouping remaining terminal devices of the selected terminal devices into one or more new groups at least based on positions of the remaining terminal devices with respect to the AP and respective channel qualities between the remaining terminal devices and the AP such that all terminal devices within a same group are covered by a beam, and (d) repeating steps (a)-(c) until the plurality of terminal devices are grouped; and associate each of the one or more groups with a different one of digital chains in the AP, wherein payloads, to be transmitted to terminal devices in a same group, are processed by a digital chain associated with the group.

13. The AP of claim 12, wherein the processor is further adapted to determine the priority for each of the plurality of terminal devices at least based on a type of payload to be transmitted to each of the plurality of terminal devices.

14. The AP of claim 12, wherein the processor is further adapted to map each of the digital chains to one or more antennas of the AP for downlink transmission.

15. An access point AP configured to perform downlink transmission in a beamforming radio communication network, the AP comprising: a processor and a memory, said memory containing comprising instructions executable by said processor whereby said AP is operative to:

determine a priority for each of a plurality of terminal devices;

group the plurality of terminal devices to be scheduled for the downlink transmission into one or more groups, wherein the plurality of terminal devices are grouped in a descending order of the priority by:

(a) selecting terminal devices with the highest priority among the plurality of terminal devices, (b) if one of the selected terminal devices is covered by a beam of an existing group, grouping the selected terminal device into the existing group, (c) grouping remaining terminal devices of the selected terminal devices into one or more new groups at least based on positions of the remaining terminal devices with respect to the AP and respective channel qualities between the remaining terminal devices and the AP such that all terminal devices within a same group are covered by a beam, and (d) repeating steps (a)-(c) until the plurality of terminal devices are grouped; and associate each of the one or more groups with a different one of digital chains in the AP, wherein payloads, to be transmitted to terminal devices in a same group, are processed by a digital chain associated with the group.

* * * * *